United States Patent [19]
Ford

[11] Patent Number: 5,915,798
[45] Date of Patent: Jun. 29, 1999

[54] TOWED VEHICLE BRAKING SYSTEM

[76] Inventor: Billy C. Ford, 10511 NE. 215th Court, Vancouver, Wash. 98682

[21] Appl. No.: 08/886,851

[22] Filed: Jul. 1, 1997

[51] Int. Cl.[6] .................................................. B60T 7/02
[52] U.S. Cl. ................................ 303/7; 188/3 H; 303/12
[58] Field of Search ............................ 303/7, 15, 48–49, 303/68–69; 188/3 R, 3 H, 112 R, 112 A, 12

[56] References Cited

U.S. PATENT DOCUMENTS

| | | | |
|---|---|---|---|
| 2,085,869 | 7/1937 | Ross | 188/3 H |
| 2,126,062 | 8/1938 | Valery et al. | 303/49 |
| 2,177,469 | 10/1939 | White | 303/49 |
| 2,228,631 | 1/1941 | Kuiper | 303/48 |
| 2,248,435 | 7/1941 | Pleines | 303/49 |
| 2,325,846 | 8/1943 | Forbes | 188/3 H |
| 2,674,349 | 4/1954 | Phillips | 188/3 H |
| 3,482,885 | 12/1969 | Campanini | 303/7 |
| 3,507,543 | 4/1970 | Cannella | 303/69 |
| 3,650,570 | 3/1972 | Meeks | 188/3 R |
| 3,771,838 | 11/1973 | Rossigno et al. | 303/7 |
| 3,790,807 | 2/1974 | Rossigno | 303/7 |
| 3,995,911 | 12/1976 | Kasselmann et al. | 303/2 |
| 4,398,771 | 8/1983 | McCurry et al. | 188/3 R |
| 4,635,758 | 1/1987 | Beard, Jr. | 188/3 H |
| 4,756,390 | 7/1988 | Meadows | 188/3 |
| 4,786,116 | 11/1988 | Schulz | 303/40 |
| 5,031,729 | 7/1991 | Wittkop et al. | 188/3 H |
| 5,141,292 | 8/1992 | Gardell et al. | 303/7 |
| 5,411,321 | 5/1995 | Harness | 303/7 |
| 5,431,253 | 7/1995 | Hargrove | 188/112 R |
| 5,465,813 | 11/1995 | Lichter | 188/3 H |
| 5,503,468 | 4/1996 | Saffran | 188/3 H |

OTHER PUBLICATIONS

"Dinghy Brake Buyers Guide", article by Ken Freund, MotorHome, Apr. 1997, pp. 65–69.

*Primary Examiner*—Douglas C. Butler
*Attorney, Agent, or Firm*—Chernoff, Vilhauer, McClung & Stenzel, LLP

[57] ABSTRACT

A towing/towed vehicle braking system translates towing vehicle braking fluid pressure into air pressure. An actuator is driven by this air pressure to depress the towed vehicle brake pedal in response to an elevated level of towing vehicle brake fluid pressure. A three-way valve controlled by the brake light wire of the towing vehicle releases the air pressure in the conduit when the towing vehicle brakes are released.

6 Claims, 2 Drawing Sheets

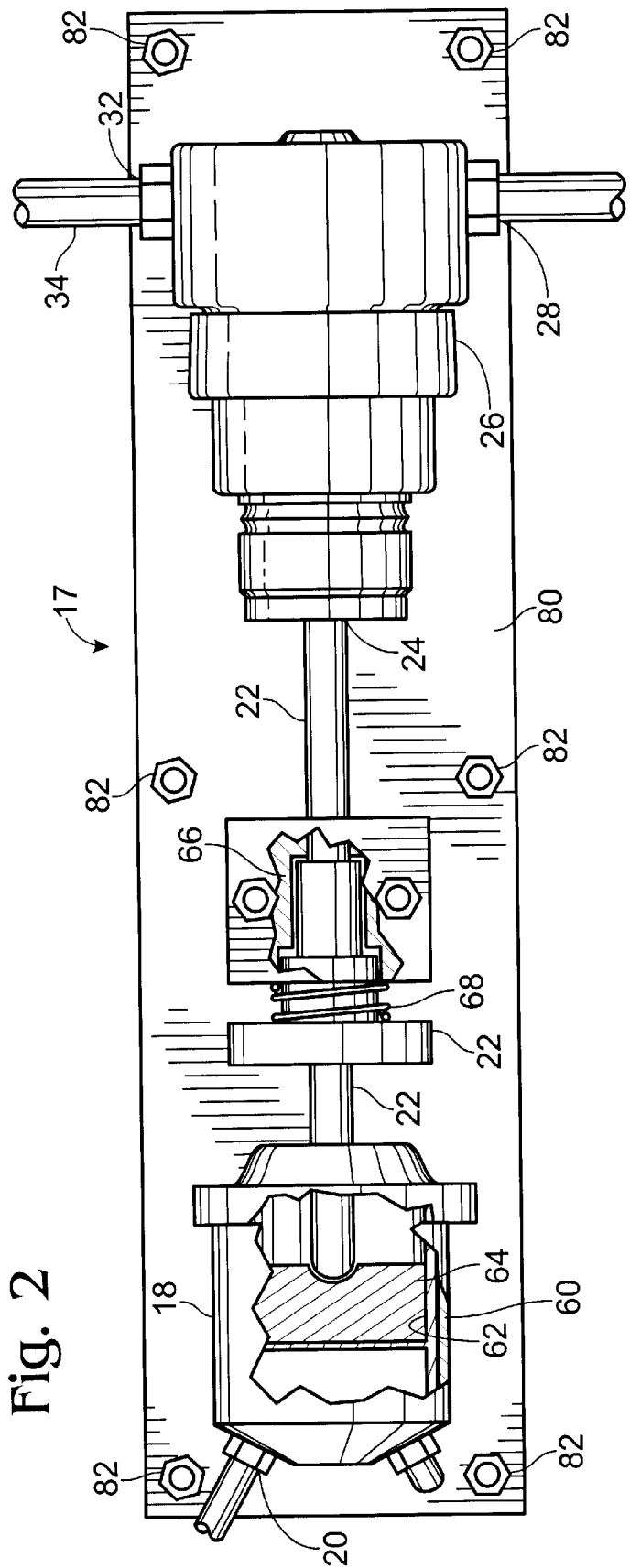

TOWED VEHICLE BRAKING SYSTEM

BACKGROUND OF THE INVENTION

The present invention is a braking system for applying the brakes of a towed vehicle in tandem with the brakes of a towing vehicle.

Those who travel by motor home sometimes wish to tow an automobile. In this situation, which represents the most typical application of the present invention, it is generally desirable for the towed automobile to brake in tandem with the motor home. A number of approaches have been developed to achieve this cooperative braking.

One type of towing/towed vehicle braking system is known as a surge brake system. A surge brake system senses any forward pressure of the towed vehicle against the hitch that couples the vehicles together and applies the brakes of the towed vehicle in response. Although a surge brake system has the appeal of simplicity, it is fraught with problems. First, if the towing vehicle attempts to move backwards, a surge brake system will sense a resisting forward pressure by the towed vehicle against the hitch and apply the brakes in response to this pressure. As a result, in order for the coupled vehicles to move backwards the surge brakes must be disabled, typically manually at the hitch. The task of disabling the surge brakes is difficult to accomplish quickly, making an unexpected demand to travel in reverse extremely problematic. Second, if the coupled vehicles are moving over a hilly or curvy road, the surge brake system is likely to jolt the vehicles. This is because every time the driver takes his foot off the brake pedal of the towing vehicle there will be a moment when the brakes of the towed vehicle remain activated due to the lag time of the mechanical surge brake system. When the towed vehicle brakes are released the occupants will feel a forward jolt if the driver has switched quickly from brake pedal to accelerator.

Another system that is similar to the surge braking system has an accelerometer in the towed vehicle that applies the brakes in response to deceleration. An accelerometer-driven brake system suffers from the same problems encountered with a surge brake system.

Another type of towing/towed vehicle braking system uses a sensor under the brake pedal of the towing vehicle that is operatively connected to an actuator for depressing the brake pedal of the towed vehicle. Towing vehicle brake pedal sensor systems are difficult to install because the brake pedal portion of the cab of a typical motor home is fairly inaccessible to a technician. Additionally, the sensor is a nuisance to the driver as it is directly under the brake pedal, where it may easily be kicked.

Yet another type of towing/towed vehicle braking system includes a device for measuring the towing vehicle brake fluid pressure. The fluid pressure measuring device is operatively connected to an actuator that is interposed into the hydraulic braking system of the towed vehicle and applies pressure directly to the brake fluid of the towed vehicle in proportion to the towing vehicle brake fluid pressure. The braking signal is communicated from the towing vehicle to the towed vehicle by means of vacuum differential. Systems having an actuator interposed into the towed vehicle hydraulic system are so difficult to install that one manufacturer requires installation at its own factory.

Therefore, what is needed but not available is a system that is both easy to install and effective at causing the braking system of a towed vehicle to operate in tandem with the braking action of a towing vehicle.

SUMMARY OF THE INVENTION

The present invention is a towed vehicle brake actuation system for depressing the brake pedal of a towed vehicle in response to an elevated level of brake fluid pressure of a towing vehicle. The system includes a conduit coupler for coupling into a brake fluid conduit of the towing vehicle. An actuator that is operatively connected to the conduit coupler moves a responsive member in response to the brake fluid pressure of the towing vehicle. The responsive member is coupled to a control input member of an air regulator that also includes an entrance orifice that receives compressed air from an air compressor and an exit orifice adapted to expel air having a pressure level that is controlled by the control input member. An air pressure conduit is operatively connected to the exit orifice. The air pressure conduit, in turn, is connected to an air pressure responsive actuator having a body, an actuator entrance orifice, and a shaft that is thrust outwardly from the body with a force that is related to the air pressure received at the entrance orifice. The actuator shaft is connected to the brake pedal of the towed vehicle and is adapted to depress the brake pedal in response to an elevated level of air pressure received at the actuator entrance orifice.

This and other objectives, features, and advantages of the invention will be more readily understood upon consideration of the following detailed description of the invention taken in conjunction with the accompanying drawings.

BRIEF DESCRIPTION OF THE DRAWINGS

FIG. 2 is an expanded view of the wheel cylinder of the brake fluid pressure-to-air pressure translation system of the towed vehicle braking system of FIG. 1.

FIG. 3 is a side cross sectional view of the air regulator of the towed vehicle braking system of FIG. 1.

DETAILED DESCRIPTION OF THE PREFERRED EMBODIMENT

Figure 1:
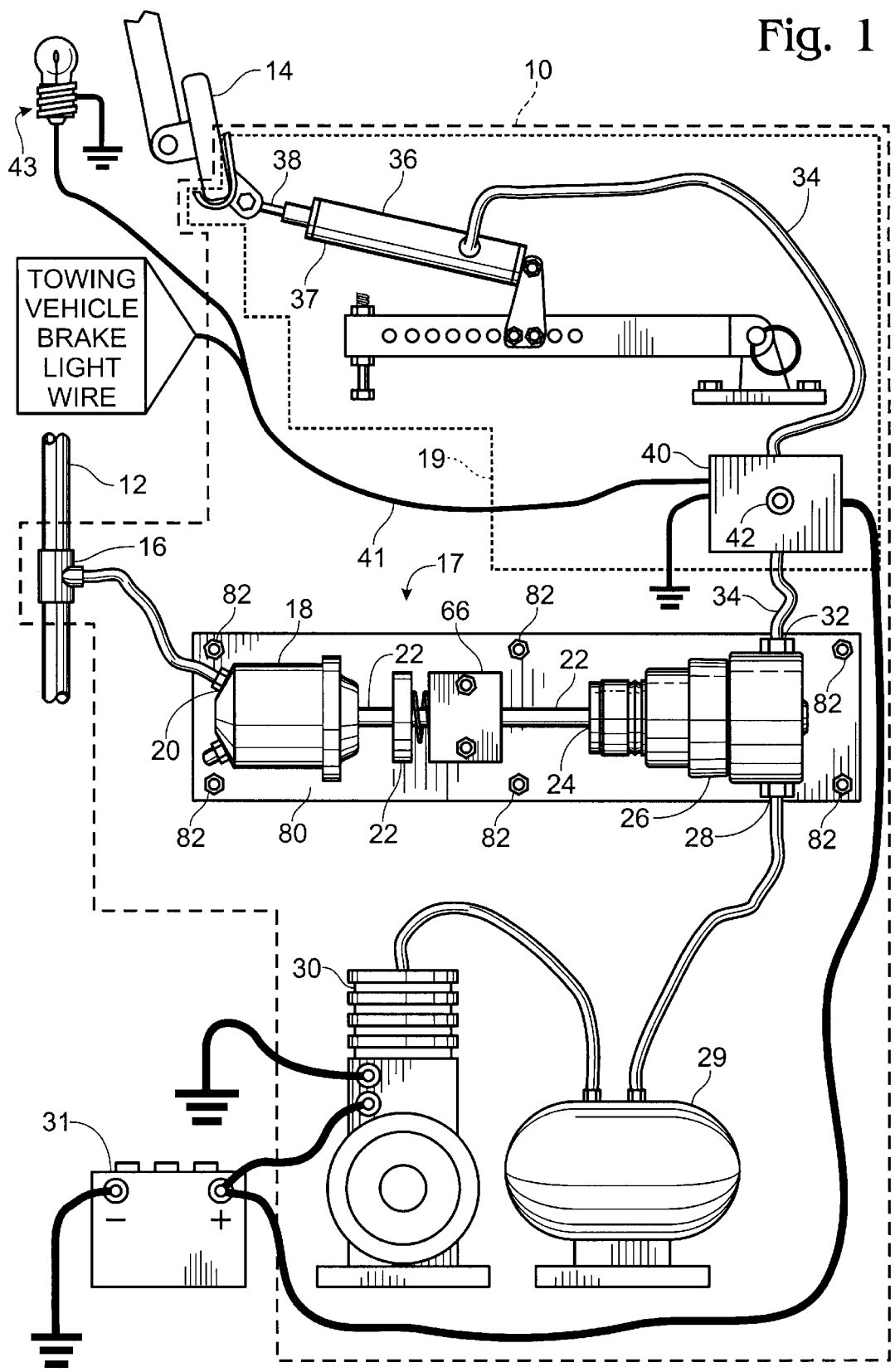
FIG. 1 is a pictorial schematic of a towed vehicle braking system in accordance with the present invention.

As shown in FIG. 1, the present invention is a towed vehicle brake actuation system 10 that is connected between a towing vehicle brake fluid conduit 12 and a brake pedal 14 of a towed vehicle. A T-connector 16 is interposed into conduit 12 and operatively connects conduit 12 to a brake fluid pressure-to-air pressure translation subsystem 17. The variable air pressure which is the product of subsystem 17 is applied to a towed vehicle brake pedal depression subsystem 19 that depresses brake pedal 14 in response to an elevated level of air pressure.

In greater detail, subsystem 17 includes a fluid pressure responsive actuator 18 having an entrance orifice 20 that is operatively connected to T-connector 16. FIG. 3 shows translation subsystem 17 in greater detail. Actuator 18 includes a cylinder 60 containing a cup seal 62 that prevents the leakage of any of the towing vehicle brake fluid. A piston 64 is attached to cup seal 62 and drives a double ended plunger 22 in response and in proportion to the brake fluid pressure against seal 62. The movement of double ended plunger 22 is constrained by spring loaded shaft stop 66. In turn, double ended plunger 22 constrains the movement of piston 64. It is important that the movement of piston 64 be narrowly constrained so that it does not significantly alter the hydraulic characteristics of the towing vehicle braking system. A spring 68 of spring loaded shaft stop 66 urges double ended plunger 22 and piston 64 back to a rest position when the towing vehicle brake fluid pressure is not at an elevated level.

As a result, a double ended plunger 22 protrudes from actuator 18 by a variable distance that is proportional to the brake fluid pressure at orifice 20. Double ended plunger 22 is fitted into a control opening 24 of an air regulator 26 (shown in detail in FIG. 3) wherein it contacts an air regulator control member 27.

Referring to FIG. 1, regulator 26 further includes an entrance orifice 28 that is operatively connected to an air tank 29 that is pressurized to 125 psi by air compressor 30. Towing vehicle battery 31 powers compressor 30.

An air exit orifice 32 of air regulator 26 is connected to a brake pedal depression subsystem 19 via an air pressure conduit 34, the air pressure in which is controlled by the degree to which double ended plunger 22 depresses control member 27. Conduit 34 is connected, via three-way air valve 40, to an air pressure responsive actuator 36 that is adapted to depress brake pedal 14.

Three-way air valve 40, interposed into air conduit 34 between regulator 26 and actuator 36 releases the air pressure in conduit 36 when the towing vehicle brakes and released. Valve 40 is electrically connected to a brake light wire 41 of the towing vehicle and opens up, letting air from conduit 34 out from exhaust orifice 42, when a set of towing vehicle brake lights 43 are off. When brake lights 43 go on, valve 40 isolates conduit 34 from the atmosphere permitting the flow of the high air pressure which causes actuator 36 to depress brake pedal 14. When brake lights 43 go off this high pressure is released and towed vehicle brake pedal 14 is immediately released by actuator 36.

Actuator 36 includes an actuator body 37 and a shaft 38 which is projected outwardly from body 37 to depress brake pedal 14 with a force proportional to the air pressure in conduit 34.

Cylinder 18, regulator 26, and spring loaded shaft stop 66 are rigidly attached to a mounting plate 80 which is attached to the underside of a host motor home by bolts 82.

In operation, when the driver of the towing vehicle depresses the brake pedal the brake fluid pressure in conduit 12 increases. This causes double ended plunger 22 to depress control member 27 (FIG. 3), thereby increasing the air pressure in conduit 34. Because brake lights 43 are on, three-way air valve 40 will not release the air pressure in conduit 34 to the atmosphere through exhaust orifice 42. The increase in air pressure in conduit 34 activates the actuator 36 so that shaft 38 projects outward from body 37 to depress brake pedal 14. When the towing vehicle driver releases the brake pedal the reverse process occurs. The air pressure in conduit 34 is quickly released by three-way air valve 40 when brake lights 43 go off.

Actuator 18 is a wheel cylinder made by Bendix Corporation and identified as part no. AH-33134. This part includes cup seal 62 and piston 64 and is available from Otto Friction Supply Inc. 201 N. Colombia Blvd., Portland Oreg. 97217. Spring loaded double ended plunger stop 66 and double ended plunger 22 are machined from steel and are as they appear in the drawings. Spring 68 may be purchased from Century Spring Corp., P.O. Box 15287, 222 East 16th Street, Los Angeles, Calif. 90015 and is identified as part No. D-1233. Air pressure responsive actuator 36 is available from Buchanon Air Inc., P.O. Box 124 Mukita, Wash. 98275, as air cylinder no. 174P. Air compressor 30 is a common industry item. Air regulator 26 is a modified Watts Air Regulator model no. R35-02C, serial no. 862, which is available from Buchanon Air Inc. The modification that is performed to air regulator 26 is the removal of the adjusting cap and adjusting screw. A 1.65 cm (⅝ inch) hole is drilled through the end cap and a nylon bushing guide is inserted into this hole to form control opening 24.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A towed vehicle brake actuation system for depressing a brake pedal of a towed vehicle in response to an elevated level of hydraulic brake fluid pressure in a towing vehicle, said system comprising:

a conduit coupler adapted to couple into a hydraulic brake fluid conduit of said towing vehicle;

a hydraulic brake fluid responsive actuator operatively connected to said conduit coupler and adapted to move a responsive member in response to a change in said hydraulic brake fluid pressure of said towing vehicle;

an air regulator having a control member operatively connected to said responsive member, an entrance orifice adapted to receive compressed air, and an exit orifice adapted to expel air having a variable pressure level that is controlled by said control member, said air regulator expelling air having a brake application indicating air pressure level in response to said elevated level of hydraulic brake fluid pressure;

a compressed air source operatively connected to said entrance orifice;

an air pressure conduit, operatively connected to said exit orifice; and an air pressure responsive actuator having a body, an actuator entrance orifice operatively connected to said air pressure conduit to receive said air having said variable pressure level, and a member that is thrust outwardly from said body with a force that is related to said variable pressure level, said member adapted to be operatively connected to said brake pedal of said towed vehicle and adapted to depress said brake pedal of said towed vehicle in response to said brake application indicating air pressure level received at said actuator entrance orifice, said brake application indicating air pressure level being related to said elevated hydraulic brake fluid pressure of said towing vehicle.

2. The brake actuation system of claim 1, wherein said hydraulic brake fluid responsive actuator comprises:

a cylinder having an input port operatively connected to said towing vehicle hydraulic brake fluid conduit;

a piston movably mounted within said cylinder adapted to move in response to changes in pressure in said hydraulic brake fluid conduit; and wherein said responsive member is a double ended plunger operatively connected to and driven by said piston and moving in response to said changes in pressure in said hydraulic brake fluid conduit.

3. The brake actuation system of claim 2, wherein said hydraulic brake fluid responsive actuator further comprises a resilient sealing element interposed between said input port and said piston for preventing the leakage of hydraulic brake fluid.

4. The brake actuation system of claim 2, wherein said hydraulic brake fluid responsive actuator further comprises a stop for preventing said double ended plunger from moving greater than a predetermined amount.

5. The brake actuation system of claim 2, wherein said hydraulic brake fluid responsive actuator further comprises a spring adapted to urge said double ended plunger to a predetermined position when said hydraulic brake fluid pressure level is not at an elevated level.

6. The brake actuation system of claim 1 wherein said towed vehicle further includes brake lights and a brake light wire for powering said brake lights and said system further includes a three-way valve interposed into said air conduit and electrically connected to and controlled by said brake light wire of said towing vehicle for releasing said air pressure when said towing vehicle brake lights are off.

* * * * *